(12) United States Patent
Shain

(10) Patent No.: US 7,090,454 B2
(45) Date of Patent: Aug. 15, 2006

(54) RATCHET INTERLOCKING HOUSING

(75) Inventor: Thomas A. Shain, Westerville, OH (US)

(73) Assignee: Floyd Bell, Inc., Columbus, OH (US)

( * ) Notice: Subject to any disclaimer, the term of this patent is extended or adjusted under 35 U.S.C. 154(b) by 190 days.

(21) Appl. No.: 10/651,280

(22) Filed: Aug. 28, 2003

(65) Prior Publication Data
US 2005/0016115 A1    Jan. 27, 2005

Related U.S. Application Data

(63) Continuation-in-part of application No. 29/186,958, filed on Jul. 24, 2003.

(51) Int. Cl.
F16B 21/02    (2006.01)

(52) U.S. Cl. .............. 411/431; 411/427; 411/429; 411/432; 411/433; 411/434; 411/436; 411/551; 411/552; 411/553; 411/273; 411/190

(58) Field of Classification Search ............... 411/427, 411/429, 431, 432, 433–434, 436, 337, 299–300, 411/418, 437, 941.1, 420, 551–553, 190–195, 411/198–204, 207–216, 272–273, 275–279
See application file for complete search history.

(56) References Cited

U.S. PATENT DOCUMENTS

| 763,210 | A |   | 6/1904 | Schwamberger et al. |
|---|---|---|---|---|
| 2,517,364 | A | * | 8/1950 | Torresen ............ 411/432 |
| 2,730,154 | A | * | 1/1956 | Aspey ............ 411/321 |
| 2,896,496 | A | * | 7/1959 | Gerhart ............ 411/347 |
| 4,293,984 | A |   | 10/1981 | Kaufmann, Jr. |
| 4,705,442 | A |   | 11/1987 | Fucci |
| 4,826,379 | A | * | 5/1989 | Norden ............ 411/437 |
| 4,850,778 | A | * | 7/1989 | Clough et al. ............ 411/433 |
| 4,907,926 | A | * | 3/1990 | Wing ............ 411/366.3 |
| 4,940,377 | A | * | 7/1990 | Reynolds ............ 411/432 |
| 4,990,044 | A | * | 2/1991 | Kimak ............ 411/427 |
| 5,139,380 | A | * | 8/1992 | Reynolds ............ 411/437 |
| 5,160,233 | A | * | 11/1992 | McKinnis ............ 411/433 |
| 5,178,504 | A | * | 1/1993 | Falchi ............ 411/553 |
| 5,304,022 | A | * | 4/1994 | Huska ............ 411/366.1 |
| 5,492,391 | A | * | 2/1996 | Snook ............ 301/35.58 |
| 5,541,377 | A | * | 7/1996 | Stuhlmacher ............ 200/296 |
| 5,640,749 | A | * | 6/1997 | Junkers ............ 29/446 |
| 5,690,460 | A | * | 11/1997 | Attanasio ............ 411/551 |
| 5,713,708 | A |   | 2/1998 | Van derDrift et al. |
| 5,797,572 | A |   | 8/1998 | Schmucki et al. |
| 5,927,920 | A | * | 7/1999 | Swanstrom ............ 411/180 |

(Continued)

Primary Examiner—Jeanette E. Chapman
(74) Attorney, Agent, or Firm—Jason H. Foster; Kremblas, Foster, Phillips & Pollick

(57) ABSTRACT

A fastener, such as a housing, for mounting to a structure, such as a panel, that has an aperture formed therethrough. The fastener includes a shank member and an annular nut member that is configured to align coaxially with the shank member. The shank member is inserted through aperture in the structure and the nut member is placed on the shank member. Teeth on the radially outwardly facing surface of the shank member engage a pawl, such as one or more teeth, on the radially inwardly facing surface of the nut member to lock the nut member to the shank member. Removal of the nut member is effected by rotating the nut member to disengage the pawl from the teeth, thereby permitting longitudinal displacement of the nut member off of the shank member.

86 Claims, 9 Drawing Sheets

U.S. PATENT DOCUMENTS 5,944,467 A * 8/1999 Yuta .......................... 411/433
5,980,177 A   11/1999 Schiess et al.
6,079,922 A *  6/2000 Ross et al. ................. 411/180
6,345,946 B1 * 2/2002 Mainini et al. ............. 411/508
6,860,693 B1 * 3/2005 Jones et al. ................ 411/433

* cited by examiner

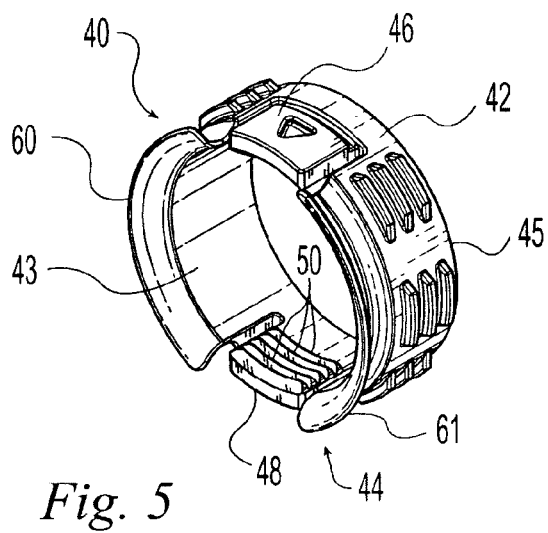
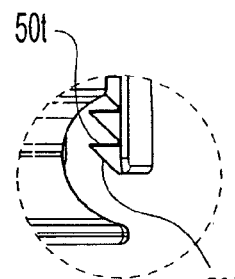
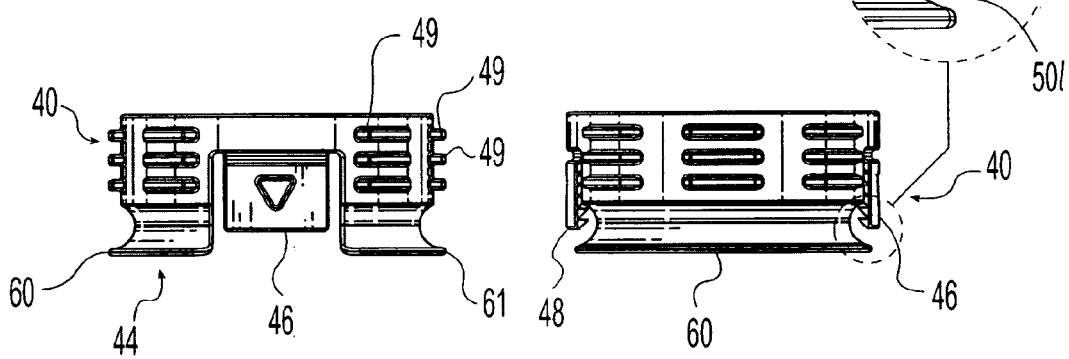
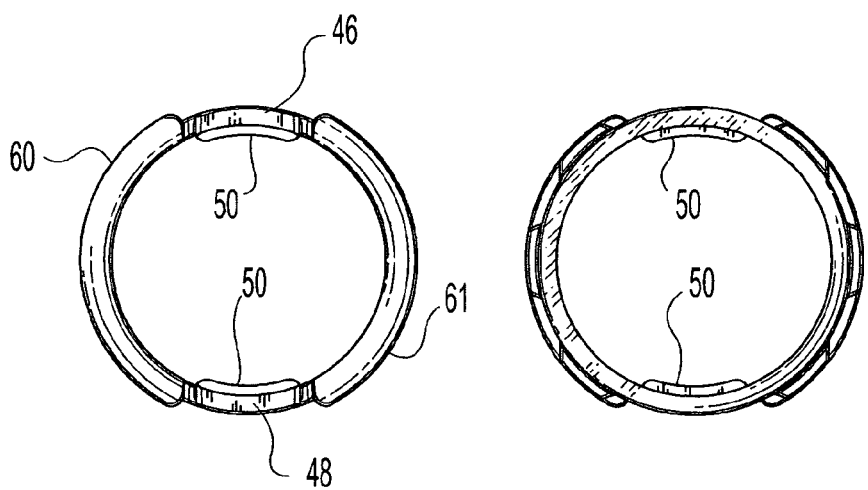
Fig. 5
Fig. 6    Fig. 7
Fig. 8    Fig. 9

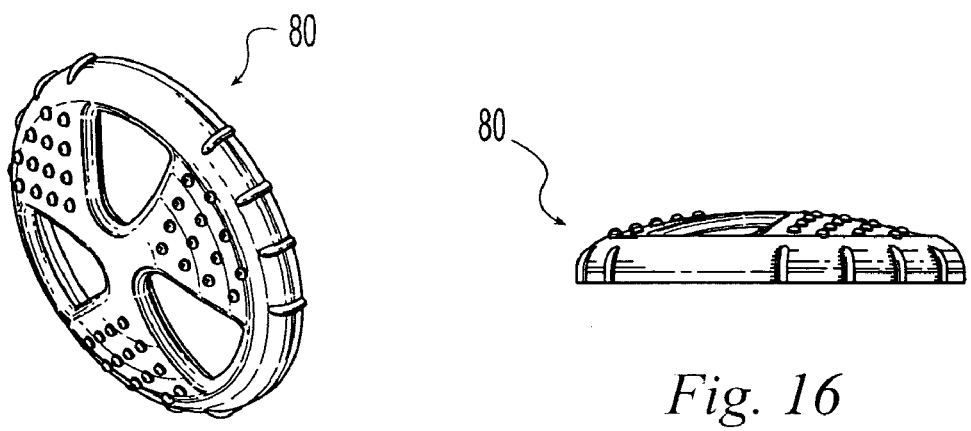
Fig. 15
Fig. 16
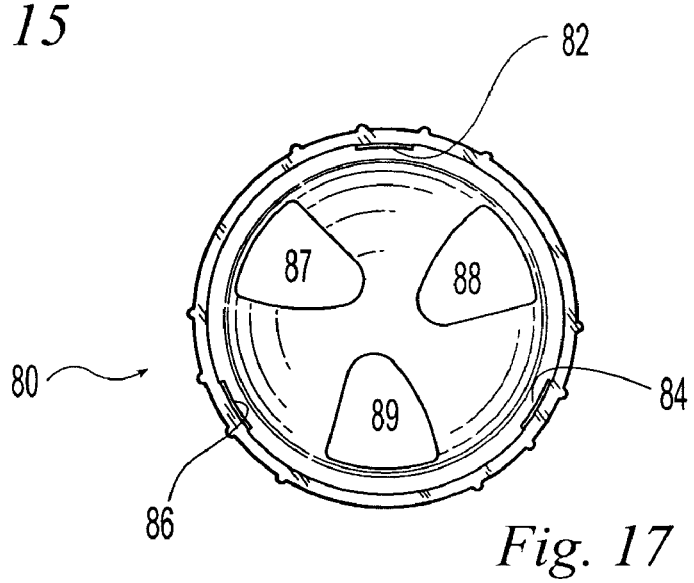
Fig. 17
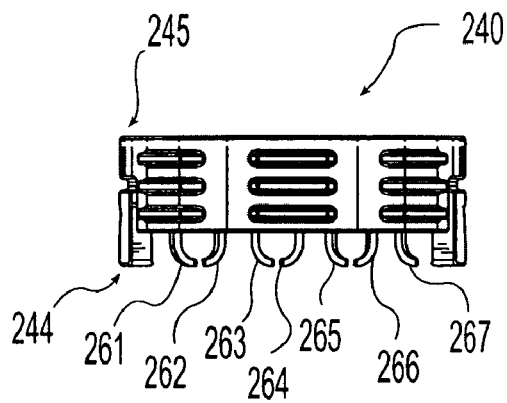
Fig. 18

RATCHET INTERLOCKING HOUSING

(b) CROSS-REFERENCES TO RELATED APPLICATIONS

This application is a continuation-in-part of U.S. application Ser. No. 29/186,958 filed Jul. 24, 2003 entitled PANEL MOUNTED HOUSING.

(c) STATEMENT REGARDING FEDERALLY-SPONSORED RESEARCH AND DEVELOPMENT (Not Applicable)

(d) REFERENCE TO AN APPENDIX (Not Applicable)

(e) BACKGROUND OF THE INVENTION

1. Field of the Invention

This invention relates generally to fasteners for mounting through an aperture in a structure, and more preferably to a fastener for mounting through an aperture in a panel where the fastener is configured to contain an object, such as a sound-emitting transducer, in the manner of a housing.

2. Description of the Related Art

There are many fasteners that are capable of fastening two or more structures together. The conventional wood or metal screw has helical threads around a shaft, and the threads seat against the inwardly facing wall of an aperture formed in the structures. As the screw shaft is rotated, the screw head is displaced closer to one side of the structures to fasten them together. Alternatively, a nut and bolt can be used to fasten two or more objects together when the shaft of the bolt is inserted through an aperture in the objects and the bolt's head seats against the object on one end of the aperture and the nut seats against the object on the opposite end of the aperture. Upon tightening of the nut relative to the bolt, the interposed objects are fastened together.

One difficulty with a conventional nut and bolt is that it often takes numerous rotations of the nut relative to the bolt to tightly interpose the structure between the head and nut. Furthermore, if carried out by hand, these numerous rotations may consume time unnecessarily or cause repetitive-motion injuries, such as carpal-tunnel syndrome.

Various attempts have been made to solve these problems. U.S. Pat. No. 5,304,022 to Huska shows a bolt with a tapered shaft and a nut with engaging pitched threads on portions of the radially inwardly facing surface of the nut. Non-threaded portions of the radially inwardly facing surface of the nut are formed between the threaded portions of the nut, and a non-threaded portion of the bolt's shaft are formed between threaded portions. This configuration permits the nut to be slid onto the shaft for a part of the shaft's length.

U.S. Pat. No. 763,210 to Schwamberger and U.S. Pat. No. 5,980,177 to Schiess et al., disclose similar nut and bolt fasteners in which a nut is rapidly slid onto the bolt's shaft and then rotated to engage pitched threads. Such devices have the disadvantage that they still require some rotation. An additional disadvantage is that the pitch and coarseness of the threads must be such that the fastener can be tightened on opposite sides of the structures on which it is attached within the partial rotation permitted before the threads disengage. Otherwise, the fasteners will disengage without being sufficiently tightened.

U.S. Pat. No. 4,990,044 to Kimak is directed to a push-on fastener in which a nut has threaded structures that can be displaced radially away from a threaded shaft to permit the nut to slide over the bolt's threads. The nut is pushed as far as desired, and then threaded the remainder of the way. A disadvantage of such a device is that the tightening force on the nut also tends to displace the threaded structures radially, thereby permitting the nut to back off and loosen the fastener. Thus, any over-tightening might cause the nut to come loose over time, especially in an environment in which there is vibration.

One particular use for the above-described fasteners is as a housing for a sound-emitting transducer, such as a piezoelectric alarm or chime. Such transducers must often be mounted through an aperture formed in a panel, such as an elevator control panel, an automobile dashboard panel, or other structure. Conventional piezoelectric transducers, such as those offered and sold by Floyd Bell, Inc., have a circular cylindrical housing that contains the circuitry and a diaphragm that vibrates upon the actuation of the piezoelectric transducer. The housing has a helically-threaded male tip that extends through the aperture in the panel. A helically-threaded female collar fits onto the threading of the tip and tightens the housing against the back of the panel in the manner of a nut and bolt.

Conventional fasteners and housings have drawbacks that should be overcome to decrease the time required for installation, reduce repetitive-action injuries, improve the appearance of the finished product and decrease the likelihood of vibrating loose.

(f) BRIEF SUMMARY OF THE INVENTION

The invention is a fastener for mounting to, and extending through an aperture formed through, a structure having a first side and an opposite, second side. In a preferred embodiment, the structure is a panel and the fastener is a housing for containing a device, such as a piezoelectric transducer.

The fastener includes a shank member and a nut member. The shank member has first and second ends and a sidewall with a radially outwardly facing surface. The shank member is designed to extend through the aperture in the panel. The first end of the shank member has a head for stopping the shank member from passing entirely through the aperture.

The nut member is an annulus having a radially inwardly facing surface and a first end. A spring is adapted to engage the structure and one of the members, and apply a bias to the structure and the engaged member. In one embodiment, the spring is mounted to the first end of the nut member and applies a bias to the structure and the nut member. Alternatively, the spring can be separate from the nut member. In another embodiment, the spring engages the shank member and applies a bias to the structure and the shank member. It is contemplated that the spring can engage the structure and one of the members with the spring having a rigid member attached thereto for seating against the structure and/or one of the members, because the spring includes rigid and non-rigid extensions mounted thereto.

The invention includes a plurality of longitudinally aligned teeth separated by gaps between adjacent teeth formed on the radially facing surface of a first of the members. At least one pawl is formed on the radially facing surface of a second of the members. The pawl is configured to extend into one of the gaps when the first of the members is positioned adjacent the second of the members. In a preferred embodiment, the first of the members is the shank member, and the second of the members is the nut member. In this embodiment, the teeth are formed on the radially outwardly facing surface of the shank member and the pawl is formed on the radially inwardly facing surface of the nut member. In an alternative embodiment the first of the members is the nut member and the second of the members is the shank member. Thus, the positions of the teeth and the pawl can be reversed, and either can be formed on the radially inwardly facing surface of the nut member or the radially outwardly facing surface of the shank member.

In a preferred embodiment, the invention is used to house a sound-emitting transducer, such as a panel-mounted, audible signal or alarm. Such a sound emitting transducer is tuned to the dimensions of the chamber formed in the shank member.

(g) BRIEF DESCRIPTION OF THE SEVERAL VIEWS OF THE DRAWINGS

FIG. 5 is a view in perspective illustrating the nut member.

FIG. 6 is a plan view illustrating the nut member.

FIG. 7 is a side view illustrating the nut member.

FIG. 8 is an end view illustrating the nut member.

FIG. 9 is an end view, opposite the view of FIG. 8, illustrating the nut member.

FIG. 15 is a view in perspective illustrating the preferred embodiment of the cap.

FIG. 16 is a side view illustrating the preferred embodiment of the cap.

FIG. 17 is a plan view illustrating the underside of the preferred embodiment of the cap.

FIG. 18 is a side view illustrating an alternative embodiment of the nut member.

Figure 1:
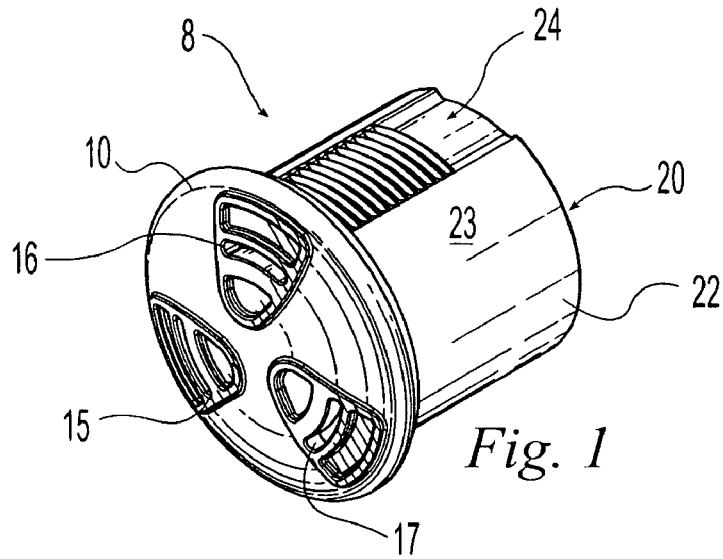
FIG. 1 is a view in perspective illustrating the shank member.
Figure 2:
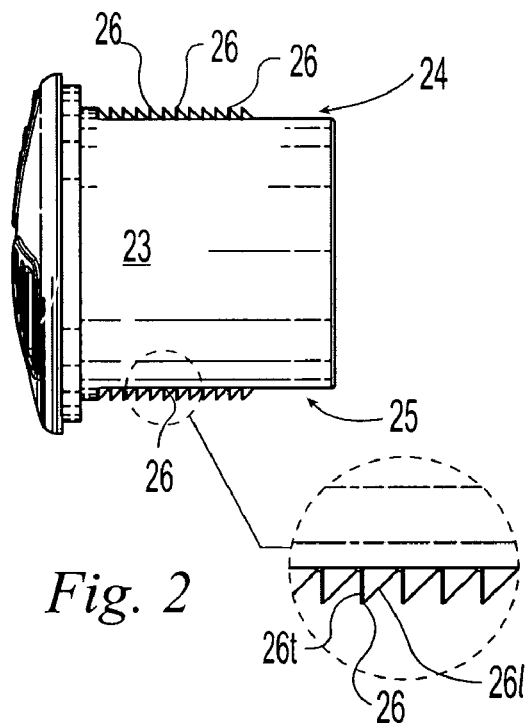
FIG. 2 is a side view illustrating the shank member.
Figure 3:
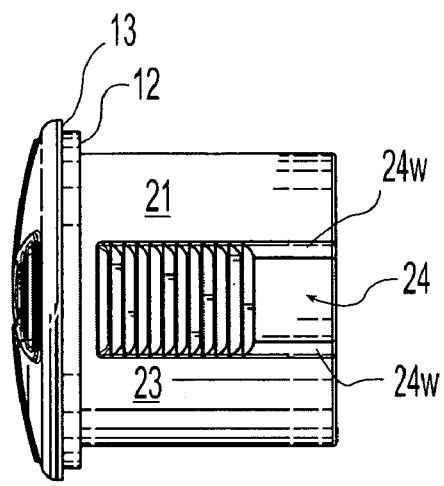
FIG. 3 is a plan view illustrating the shank member.
Figure 4:
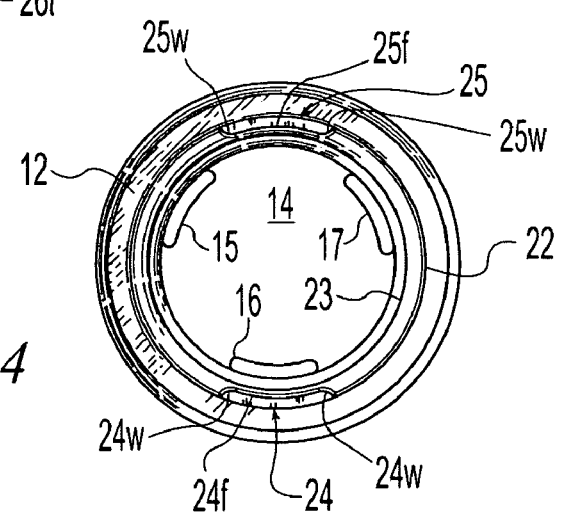
FIG. 4 is an end view illustrating the shank member.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The preferred embodiment of the present invention has two main components: a shank member 8 and a nut member 40. In a preferred configuration, the nut member 40 is mounted to the shank member 8 after the shank member 8 is inserted through an aperture in a panel or another structure. The shank member 8 is installed through the panel aperture with the head 10 of the shank member 8 at the front of the panel and the nut member 40 at the rear. Of course, this could be reversed, for example, for switches mounted in the shank member 8.

The shank member is shown in FIGS. 1 through 4 having the head 10 and a sidewall 20. The sidewall 20 is preferably a circular cylindrical body having a radially outwardly facing surface 22 and an opposing radially inwardly facing surface 23. The outwardly facing surface 22 has longitudinal channels 24 and 25 formed on substantially opposite sides of the sidewall 20, and longitudinal smooth regions 21 and 23 between the channels 24 and 25 that separate the channels 24 and 25 from each other. The term "longitudinal" is defined herein to mean substantially parallel to the axis of the sidewall 20. Thus, the channels 24 and 25 are longitudinal, as are the smooth regions 21 and 23. Additionally, the smooth regions 21 and 23 could be less than perfectly smooth, and indeed could be multifaceted or wavy. The important feature of the smooth longitudinal regions 21 and 23 is that they permit sliding movement of the nut member 40 as described below. The term "smooth" is defined as permitting substantially unrestricted longitudinal sliding of the surfaces of the nut member 40 that contact the smooth regions 21 and 23 during normal use.

A plurality of longitudinally aligned teeth 26 are formed in the elongated, longitudinal channels 24 and 25. The teeth 26 are separated by gaps between adjacent teeth 26. As shown in detail in FIG. 2, each tooth 26 has a leading wall 26*l* and a trailing wall 26*t*, both of which are transverse to the axis of the shank member 8. It is preferred that the trailing wall 26t be substantially perpendicular to the axis of the shank member 8, and the leading wall 26l be at an angle that is not perpendicular, thereby creating a saw tooth structure with oblique leading walls and perpendicular trailing walls relative to the axis of the sidewall 20.

The channels 24 and 25 have a radially outwardly facing floor 24f and 25f, respectively, the lateral boundaries of which are defined by the channel walls 24w and 25w, respectively, at opposite lateral channel sides. Each channel wall is inclined from the channel floor radially and laterally outwardly toward the substantially smooth longitudinal regions 21 and 23 of the sidewall 20 between the channels 24 and 25, thereby forming ramped surfaces extending from the channels' floors to the smooth regions 21 and 23. In a preferred embodiment the tip of each tooth 26 is at substantially the same radial distance from the sidewall's axis as the smooth regions 21 and 23, and the deepest part of each gap is at substantially the same radial distance as the floors of the channels.

It is apparent that the channels 24 and 25 are longitudinally aligned, locally thinned regions of the sidewall 20 with teeth 26 aligned therein. The inclined walls 24w and 25w extend from the floors 24f and 25f, and from the deepest parts of the gaps between the teeth 26, to the substantially smooth regions 21 and 23. Each tooth 26 has opposing ends that terminate at the walls of the respective channel in which the tooth 26 is formed. Additionally, the teeth 26 preferably are not pitched like screw threads, although this is a possible alternative to the preferred configuration.

The head 10 is rigidly mounted at one end of the shank member 8, and is preferably integrally formed with the sidewall 20. The preferred head 10 is defined by a radially outwardly extending shoulder 12 that, when the sidewall 20 is extended through an aperture in a panel or other structure, seats against one side of the panel or other structure. The head 10 could alternatively be removably mounted to the sidewall 20 at the time of manufacture, or it could be mounted to the sidewall 20 removably or permanently during the process of installing the shank member 8 and nut member 40 to a panel or other structure.

The preferred shoulder 12 extends at a ninety degree (90°) angle from the sidewall 20, although it is possible that a shoulder can extend at a smaller or larger angle. The critical structure of the head is a radially outwardly extending shoulder, at the transition between the shank member sidewall and the head, that seats against the panel or other structure through which the shank member 8 extends and prevents passage of the shank member 8 completely through the aperture. Thus, one contemplated alternative head has a shoulder extending at a 179 degree angle relative to the sidewall 20 and another alternative head has a shoulder that extends at a 1 degree angle relative to the sidewall 20. The shoulder could be at any angle in between. The shoulder of an alternative embodiment does not have to seat against one side of the panel or other structure, but can seat against the surface defining the aperture through the panel or other structure, which aperture could be conically shaped to receive a shoulder's complementary conical shape.

The head 10 also caps the sidewall 20 of the shank member 8. An internal chamber is defined by the radially inwardly facing surface 23 and the inner surface 14 of the head 10. There are small apertures 15, 16 and 17 formed in the head 10 to permit air to move from the internal chamber to the exterior of the shank member 8 through the head 10. In one contemplated embodiment, a sound-emitting transducer, such as a piezoelectric alarm, is housed in the internal chamber. Such a transducer produces sound waves in a conventional manner, and these sound waves can pass easily through the head 10 via the apertures 15, 16 and 17. Alternatively, a switch can be mounted in the chamber.

The nut member 40 is shown in FIGS. 5 through 9 having an annular, preferably circular cylindrical configuration with a radially outwardly facing surface 42, a radially inwardly facing surface 43, a first end 44 and a second end 45. The radius of the radially inwardly facing surface 43 is similar to, and preferably slightly greater than, the radius of the radially outwardly facing smooth regions 21 and 23 of the shank member 8. Thus, the nut member 40 can be aligned coaxially with the sidewall 20 of the shank member 8, and slid onto the sidewall 20 with the radially inwardly facing surface 43 adjacent to, and preferably slidably contacting, the radially outwardly facing smooth regions 21 and 23.

A first tab 46 and a second tab 48 are formed on substantially opposite sides of the nut member 40, and are part of the nut member 40. There could be only one, or more than two tabs on the nut member 40, and the two or more tabs could be other than oppositely positioned around the nut member 40. The tabs 46 and 48 extend longitudinally along the sides of the nut member 40 in the manner of cantilevers. The nut member 40 is preferably made of plastic or another material that has inherent resiliency, which causes the tabs 46 and 48 to be resilient and therefore to have free ends which can be bent radially inwardly and outwardly.

Each tab has at least one, and preferably more than one, tooth 50 formed on the radially inwardly facing surface 43. In the preferred embodiment, there are multiple longitudinally aligned teeth 50 separated by gaps, and each tooth 50 forms a pawl at the radially inwardly facing surface 43 of the tabs 46 and 48. The teeth 50 have a leading wall 50l that is transverse to the axis of the nut member 40, and a trailing wall 50t that is transverse, and preferably substantially perpendicular, to the axis of the nut member 40. Thus, the teeth 50 can lock with the teeth 26 to prevent, or at least substantially hinder, longitudinal movement of the nut member 40 relative to the shank member 8 in the direction of the trailing walls 50t and 26t abutting one another, but permit movement in the opposite longitudinal direction because the leading walls 50l can slide against the leading walls 26l. The teeth 50 can extend into the gaps between the teeth 26 of the shank member 8, and vice versa, when the teeth 26 and the teeth 50 are alternatingly aligned as described below.

A first resilient flange 60 and a second resilient flange 61 are mounted to the first end 44 of the nut member 40 to form springs. The flanges 60 and 61 are preferably integrally formed with the other parts of the nut member 40, which are made of a resilient plastic or other suitable material. The resilient flanges 60 and 61 can be flexed by the amount of force that can be applied by the average human's hands in the manner of assembling the nut member 40 on the shank member 8 as is described below. The flanges 60 and 61 form protruding springs that can engage the panel or other structure to which the shank member 8 and nut member 40 are attached. Protruding springs (of which the flanges 60 and 61 are one example) also include any members that are not resilient or are less resilient and are positioned to seat against or otherwise engage the panel or other structure. Any rigid member thus mounted to the spring is considered part of the spring for the purpose of the invention.

Figure 27:
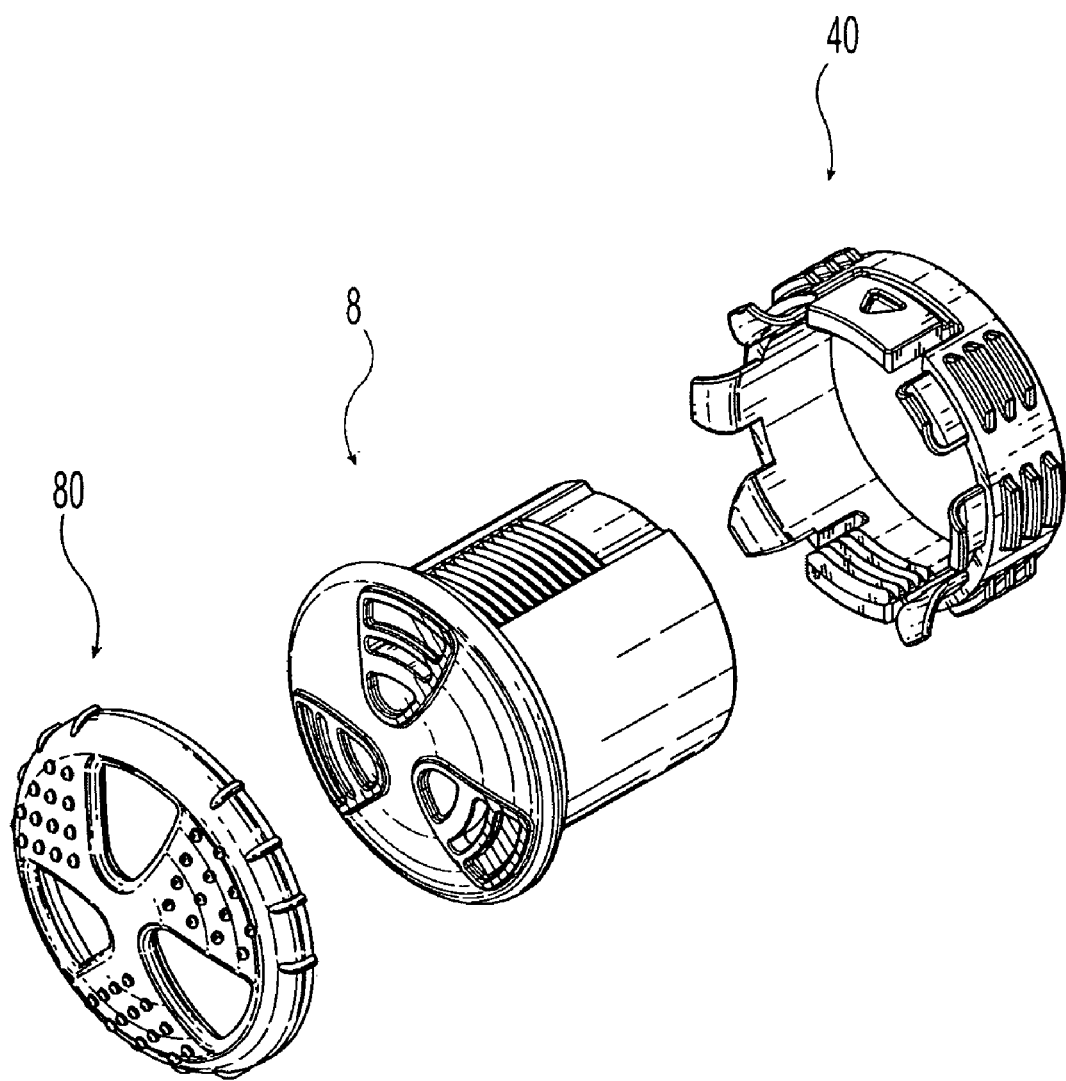
FIG. 27 is an exploded view in perspective illustrating the preferred components of the present invention aligned coaxially with one another.
Figure 28:
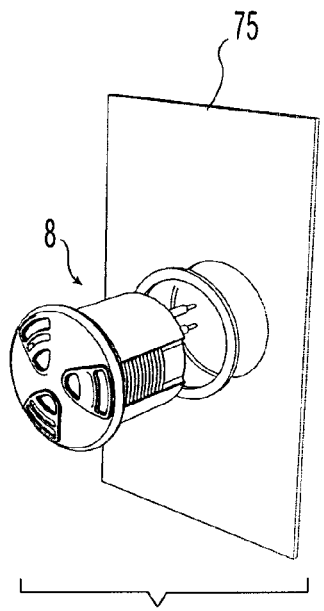
FIG. 28 is a view in perspective illustrating the shank member being inserted into an aperture in a panel.
Figure 29:
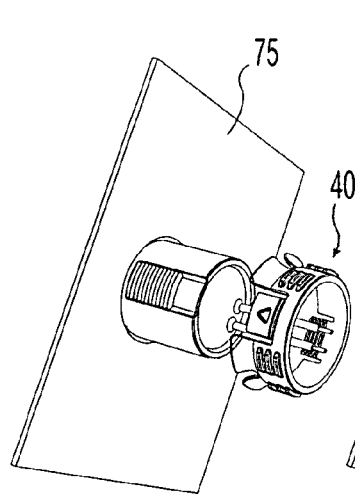
FIG. 29 is a view in perspective illustrating the nut member being aligned coaxially with the shank member.

An exploded view of the entire preferred embodiment is shown in FIG. 27. In order to assemble the above-described nut member 40 on the shank member 8, the sidewall 20 of the shank member 8 is extended through an aperture in a structure, such as the electrical panel 75 shown in FIG. 28 and in phantom in FIG. 10. The nut member 40 is then aligned substantially coaxially with the shank member 8, with the first end 44 of the nut member 40 closest to the end of the sidewall 20 that is farthest from the head 10 as shown in FIG. 29. The nut member 40 is then displaced longitudinally toward the shank member 8, and the tabs 46 and 48 and the teeth 50 thereon, are positioned directly radially outwardly of the channels 24 and 25 in registration with the channels.

As described above, the channels 24 and 25 have floors that are positioned radially inwardly from the smooth regions 21 and 23. Thus, the tabs 46 and 48 do not bend radially outwardly when the teeth 50 on the tabs 46 and 48 are positioned in the channels 24 and 25. However, because the tips of the teeth 50 are at a smaller radius than the radially inwardly facing surface 43 of the nut member 40, the tabs 46 and 48 have to bend radially outwardly slightly to permit the tips of the teeth 50 to rest against the smooth regions 21 and 23. Therefore, if the tabs 46 and 48 are not in registration with the channels 24 and 25, then a slight rotation of the nut member 40 relative to the shank member 8 will displace the teeth 50 into registration with the channels. The user will "feel" when registration occurs, because when the tips of the teeth 50 are positioned in the channels 24 and 25, there is less resistance to rotation than when there is not registration.

Once there is registration, the user applies longitudinal forces on the shank and nut members toward one another. These longitudinal forces cause the teeth 50 on the tabs 46 and 48 to slide along the channels until they abut the teeth 26 in the channels 24 and 25. The teeth 50 are substantially parallel to the teeth 26, and the dimensions of the teeth 50, including height, width, length, tooth side angles and tooth shape are preferably substantially the same. Another way of characterizing the teeth 26 and 50 is to refer to each grouping of aligned teeth as having substantially the same wave form and wavelength, the latter of which is defined as the distance from the peak of one tooth to the peak of the next adjacent tooth. This is analogous to wave terminology used in electronics.

After the initial abutment of the teeth 50 with the teeth 26, as the nut member 40 is displaced farther longitudinally onto the shank member 8, the teeth 50 on both tabs 46 and 48 are displaced radially outwardly. The tabs 46 and 48, which are radially flexible, can be displaced radially outwardly for permitting radial displacement of the teeth 50 away from the teeth 26. The outward displacement of the tabs is due to relative sliding of the inclined, oblique leading walls 26*l* and 50*l* acting as inclined planes that direct the longitudinal force radially outwardly to thereby displace the tabs 46 and 48 radially. This radial displacement permits the teeth 50 to ride up onto the teeth 26.

Figure 10:
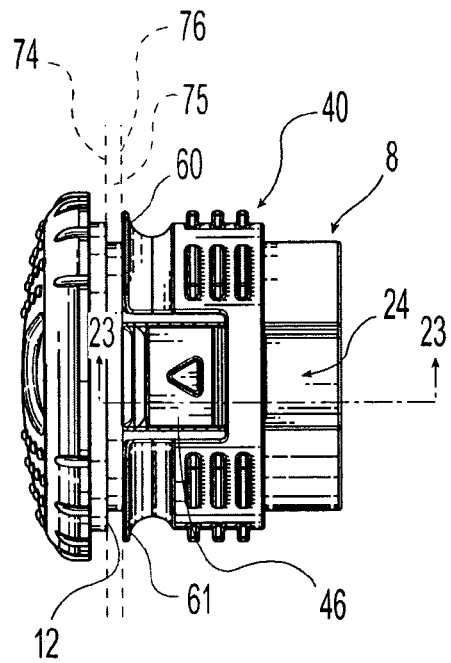
FIG. 10 is a side view illustrating the preferred embodiment of the present invention installed on a panel.
Figure 30:
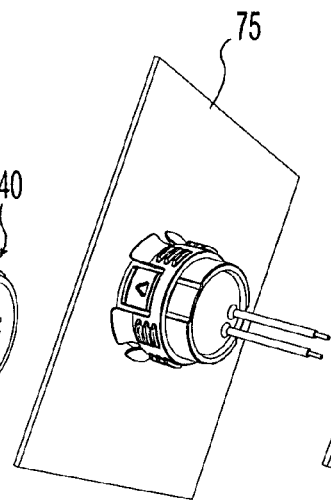
FIG. 30 is a view in perspective illustrating the nut member positioned on the shank member.

When the nut member 40 has moved longitudinally far enough onto the shank member 8 to cause the tips of the teeth 26 to slide completely up on the tips of the teeth 50, a small amount of continued longitudinal movement will cause the tips of the teeth 26 and 50 to slide past one another. When this occurs, the outwardly displaced tabs 46 and 48 will spring radially inwardly because the outwardly directed force is removed. As the tabs 46 and 48 spring radially inwardly, each of the teeth 26 will find a gap between adjacent opposing teeth 50, and vice versa, and will plunge radially to the deepest part of the gap between the respective teeth. Continued longitudinal force will cause this process of teeth 50 sliding over teeth 26 to continue until the shoulder 12 of the head 10 seats against a first side 74 of the panel 75, and the springs, preferably the flanges 60 and 61, seat against the opposite side 76 of the panel 75 as shown in FIG. 10 and FIG. 30.

At the point of initial contact between the flanges 60 and 61 and the side 76 of the panel 75, the flanges 60 and 61 are not deformed. Further displacement beyond the point of initial contact bends the flanges 60 and 61 in compression. Depending upon the relationship between the thickness of the panel wall and the wavelength of the teeth 26, at the point of initial contact the trailing wall 26*t* of the teeth 26 may not be seated against the trailing wall 50*t* of the teeth 50, which is the position at which the teeth 26 and 50 lock the nut member 40 to the shank member 8 and prevent longitudinal relative backward movement of the nut member 40 off of the shank member 8. For example, if at initial contact between the flanges 60 and 61 with the side 76 of the panel 75, the tips of the teeth 50 and 26 are in contact, release of the longitudinal force on the nut member 40 would result in a backward movement of the nut member 40 due to the tabs 46 and 48 applying a radially inwardly directed bias against the inclined leading walls 26*l* and 50*l*. In order to prevent this loose fit, after the initial contact, the nut member 40 is displaced farther longitudinally to bend the flanges 60 and 61, until the teeth 50 on the nut member 40 lock into the teeth 26 on the shank member 8 with the flanges 60 and 61 flexed. In the flexed state, the flanges 60 and 61 exert a spring bias against the panel 75 in one direction and against the nut member 40 in the opposite direction. This bias creates a tight fit against the panel to resist movement of the shank member 8 and nut member 40 relative to the panel 75 due to, for example, vibration of the diaphragm of a piezoelectric transducer mounted in the shank member 8.

Figure 23:
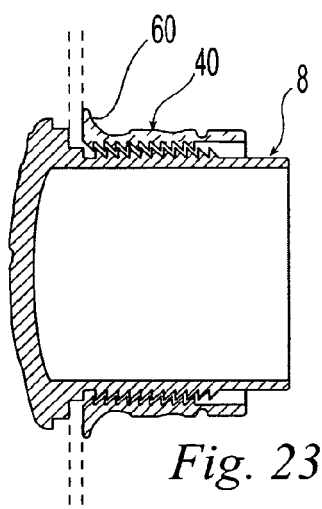
FIG. 23 is a view in section through the lines 23—23 of FIG. 10 illustrating a magnified view of the interlocking teeth of the present invention.

Thus, once initial contact is made between the flanges and the panel, the nut member 40 is displaced still further relative to the shank member 8 to tighten the assembled members that form the housing against the opposing sides of the panel 75. The user forces the nut member 40 preferably one tooth wavelength toward the panel 75 after initial contact, thereby compressing the flanges 60 and 61. The flanges 60 and 61 are compressible a distance equal to at least one tooth wavelength to permit this compression. The device makes a distinctive "click" sound whenever the members have moved another tooth wavelength. Once this compression has occurred and the teeth 50 of the tabs 46 and 48 have passed over the teeth 26 of the shank member 8 and been displaced radially into the gaps between the teeth 26, the nut member can be released and the entire combination of the shank member 8 and nut member 40 is locked in place by the spring force of the flanges 60 and 61 against the panel forcing the nut member's teeth's trailing wall 50*t* to seat against the shank member's trailing wall 26*t* as shown in FIG. 23. The radially inwardly directed force of the tabs 46 and 48 keeps the teeth 50 in the gaps between the teeth 26. The resiliently flexed flanges 60 and 61 seated against one side of the panel 75 apply a bias to the nut member 40 and the panel 75 interposed between the nut member 40 and the head 10, thereby preventing any significant lateral or longitudinal movement of the assembled fastener relative to the panel 75.

Figure 31:
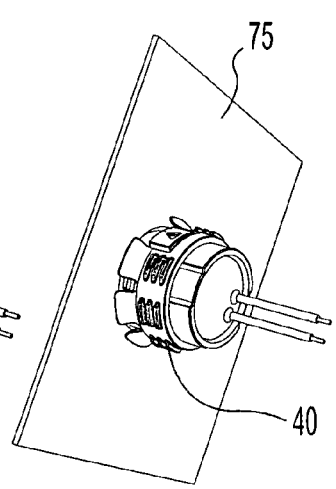
FIG. 31 is a view in perspective illustrating the nut member in a state of being removed from the shank member.

If it is desired to remove the nut member 40 from the shank member 8, the operator can grasp the head 10 with one hand and the nut member 40 with the other hand and rotate the parts relative to one another a partial turn, such as, for example, between about 20 and about 90 degrees. Gripping of the nut member 40 is enhanced by the gripping protrusions 49, which extend radially outwardly from the outer surface of the nut member 40. The relative rotation will cause the teeth 50 to come out of registration with the teeth 26 in the channels 24 and 25 and ride up onto the smooth regions 21 and 23 as shown in FIG. 31. The nut member 40 can then be pulled longitudinally off of the sidewall 20 of the shank member 8 due to the small frictional resistance to longitudinal movement of the nut member 40 that the smooth regions 21 and 23 provide to the teeth 50, thereby separating the two parts of the housing; the nut member 40 and the shank member 8.

The nut member 40 is easily removed from the shank member 8 by the rotation that causes the alignment of the teeth 50 with the smooth regions 21 and 23. The smooth regions 21 and 23 on the outer surface of the shank member are preferably positioned in pairs on opposite sides of the shank member 8, just as the tabs 46 and 48 are positioned on opposite sides of the nut member 40. The channels 24 and 25 are about one-third as wide as the smooth regions, but this relationship could be modified. Because the teeth 26 do not extend entirely around the circumference of the shank member's 8 sidewall 20, but are separated from one another by the smooth regions 21 and 23, the nut member 40 can be removed by simply positioning the tabs 46 and 48 over the smooth regions 21 and 23, because the smooth regions 22 do not significantly resist the longitudinal sliding movement of the nut member 40 relative to the shank member 8. This lack of resistance is due to the absence of any surface structures on the smooth regions 21 and 23 that would tend to engage, or be engaged by, the teeth 50.

It is preferred that the deepest points of the gaps between the teeth 26, which are the points to which the tips of the teeth 50 plunge upon passing over the tips of the teeth 26, be positioned radially inwardly of the smooth regions 21 and 23 and preferably at substantially the same radial position as the channel floors 24 and 25. This relative positioning prevents unintended rotation of the nut member 40 relative to the shank member 8. During deliberate rotation of the nut member 40 relative to the shank member 8, the tips of the teeth 50 have to be displaced radially outwardly from the deepest parts of the gaps between the teeth 26 to the smooth regions 21 and 23. The inclined channel walls 24w and 25w make it easy for the ends of the teeth 50 on the tabs 46 and 48 to slide circumferentially onto the smooth regions 21 and 23 from their more radially inward position in the channels. Without the inclination of the walls 24w and 25w, the ends of the pawl teeth 50 would abut the sides of the channels 24 and 25, making rotation for removal more difficult, and therefore this is not the preferred configuration. Of course, the walls 24w and 25w could lack the inclined surfaces so long as the ends of the teeth 50 have inclined ends as will become apparent to a person of ordinary skill. However, in the preferred embodiment both the channel walls and the ends of the teeth 50 are inclined.

The preferred embodiment of the invention is a fastener or housing that permits the nut member 40 to be positioned on the shank member 8 with one continuous movement that is longitudinal toward opposing sides of a panel or other structure through which an aperture is formed. The members seat firmly on opposite sides of the panel or other structure once fastened due to the springs that engage at least one of the panel sides, and due to the nut member 40 having discrete stops at the registration of each pawl between two adjacent teeth. Removal of the nut member 40 is easily accomplished without damage to the housing or fastener by rotating the nut member 40 relative to the shank member 8 part of a turn and pulling the two parts longitudinally away from one another. No tools are needed, and no complete rotation of one member relative to the other is required for fastening or for removal.

Figure 14:
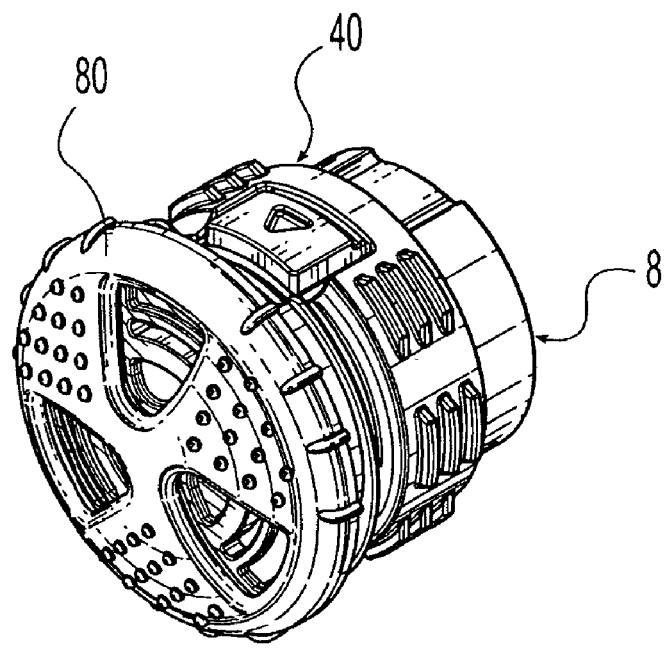
FIG. 14 is a view in perspective illustrating the preferred embodiment of the present invention with the cap in an operable position.
Figure 32:
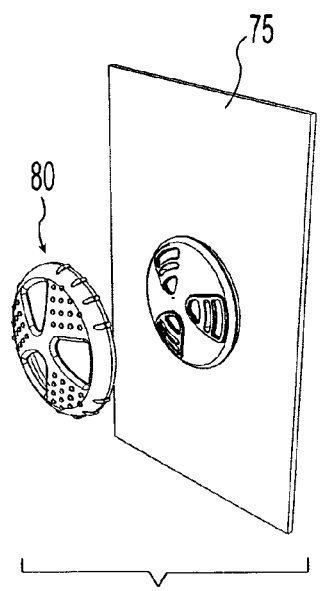
FIG. 32 is a view in perspective illustrating the cap being mounted on the head.
Figure 33:
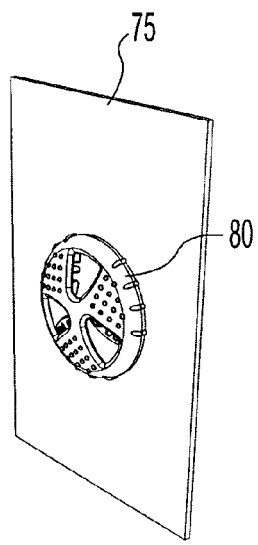
FIG. 33 is a view in perspective illustrating the cap mounted on the head and slightly offset to restrict the movement of sound through the head.

The cap 80 is preferably rotatably mounted to the head 10 as shown in FIGS. 10, 14 and, just prior to mounting, in FIGS. 27 and 32. The cap 80, shown in FIGS. 15, 16 and 17, preferably has three lips 82, 84 and 86 that extend radially inwardly from an outer cap wall. The lips extend beneath the rim 13 of the head 10 when the cap 80 is positioned on the head 10 as shown in FIG. 14. The cap has apertures 87, 88 and 89 that can be registered with openings 15, 16 and 17 in the head 10 to permit sound waves to travel unobstructed from the chamber in the shank member 8, or can be positioned in an offset position, as shown in FIG. 33, to partially or completely block the transmission of sound waves through the openings 15, 16 and 17.

Figure 19:
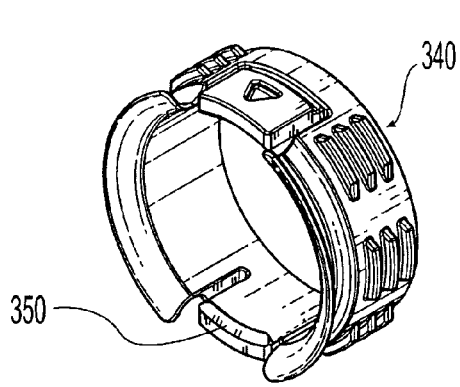
FIG. 19 is a view in perspective illustrating an alternative embodiment of the nut member.

It will become apparent from the description herein that there are various alternative structures that can accomplish the purpose of the preferred embodiment. For example, in the preferred embodiment, the pawl is actually a plurality of pawls formed by the teeth 50. Of course, it would be possible to limit the pawl to just one tooth 350, as in the nut member 340 shown in FIG. 19. The single tooth 350 cooperates with the teeth 26 of the shank member 8 to lock the nut member 340 in place on the shank member 8.

Figure 20:
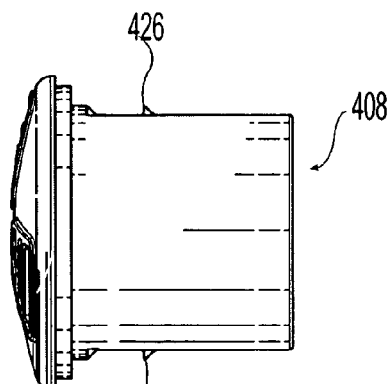
FIG. 20 is a side view illustrating an alternative embodiment of the shank member.
Figure 21:
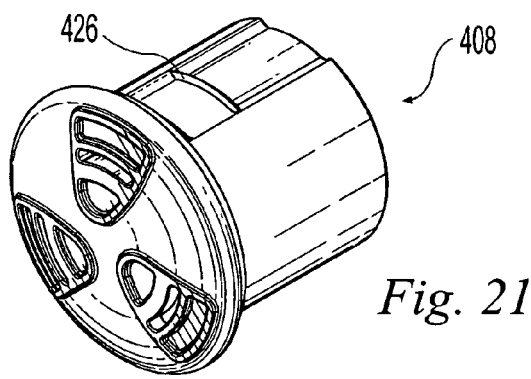
FIG. 21 is a view in perspective illustrating the alternative embodiment of the shank member of FIG. 20.

In a different alternative embodiment, instead of the preferred plurality of teeth 26 on the shank member 8 as shown in FIGS. 1 and 5, the shank member 408 could have a single tooth 426, which forms a pawl, as shown in FIGS. 20 and 21. The teeth 50 on the tabs 46 and 48 of the nut member 40 can then cooperate with the tooth 426 on the shank member 408 to lock the nut member 40 in place on the shank member 408. In this embodiment, the pawl is on the shank member 408 and the plurality of teeth 50 are formed on the nut member 40. It is apparent that the pawl can be on the shank member or the nut member, and the plurality of teeth can be on the other of the two members. It is also contemplated that the pawl, if mounted on the shank member, can be radially displaceable. Such combinations and permutations of the number and placement of the pawl and plurality of teeth elements of the invention will become apparent to a person of ordinary skill from the preferred and alternative embodiments described and shown herein.

Figure 11:
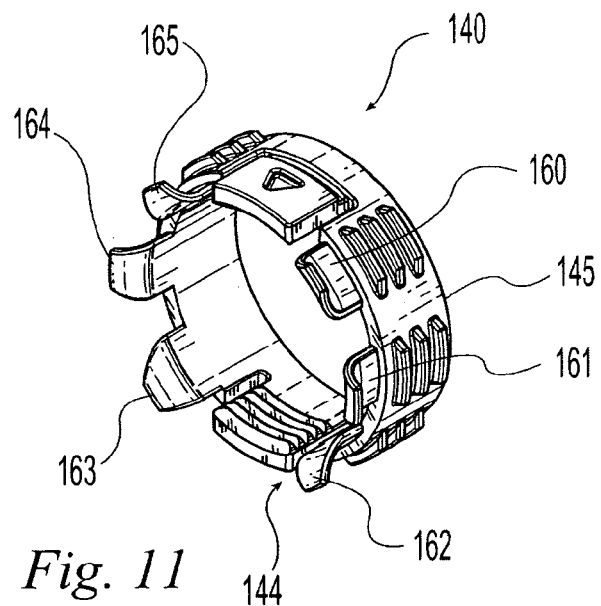
FIG. 11 is a view in perspective illustrating an alternative embodiment of the nut member.
Figure 12:
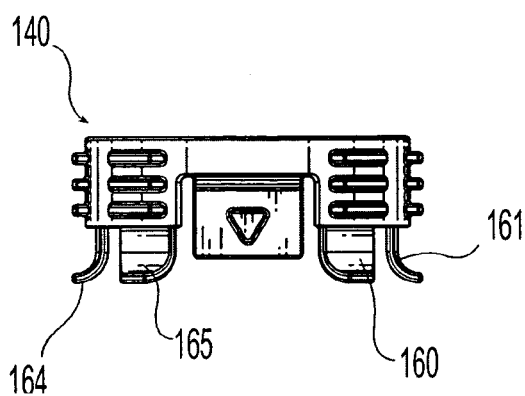
FIG. 12 is a side view illustrating the alternative nut member of FIG. 11.
Figure 13:
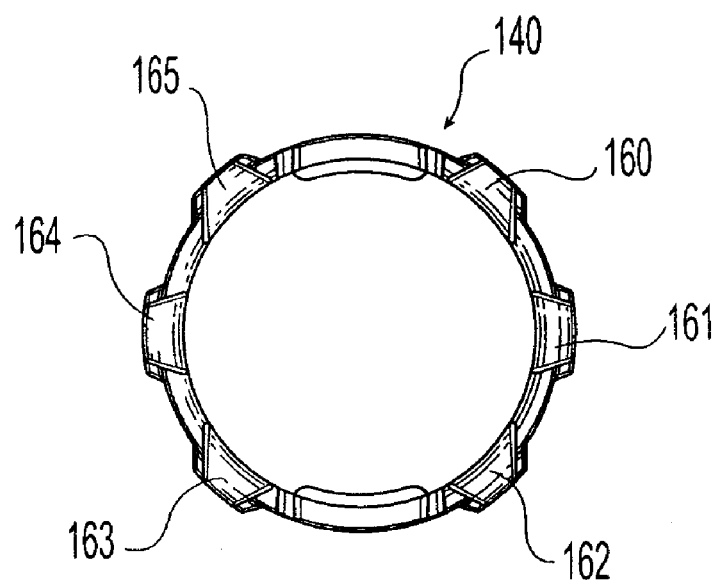
FIG. 13 is a plan view illustrating the alternative nut member of FIG. 11.

Another alternative nut member 140 is shown in FIGS. 11, 12 and 13. The nut member 140 has an annular, circular cylindrical configuration with a first end 144 and a second end 145. The configuration of the nut member 140 is virtually identical to the nut member 40, with one substantial exception. Rather than the spring being formed by the pair of flanges 60 and 61 on the nut member 40, the nut member 140 has a plurality of fingers 160, 161, 162, 163, 164 and 165. The fingers 160–165 extend longitudinally from the end 144 in much the same manner as the flanges 60 and 61 to form springs that can engage a panel or other structure to which the invention is attached. Thus, the fingers 160–165 perform essentially the same spring function as the flanges 60 and 61.

Another alternative nut member 240 is shown in FIG. 18. The nut member 240 has an annular, circular cylindrical configuration with a first end 244 and a second end 245. The configuration of the nut member 240 is virtually identical to the nut member 40, with one substantial exception. Rather than the pair of flanges 60 and 61 formed on the nut member 40, the nut member 240 has a plurality of smaller fingers 260–267. The fingers 260–267 extend longitudinally from the end of the nut member 244 to form springs that can seat against a panel or other structure to which the invention is attached to. Thus, the fingers 260–267 perform essentially the same function as the flanges 60 and 61.

Figure 22:
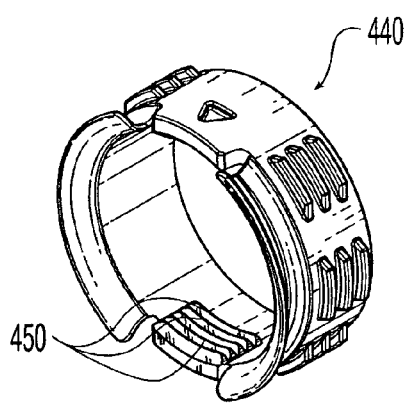
FIG. 22 is a view in perspective illustrating an alternative embodiment of the nut member.

Another alternative nut member 440 is shown in FIG. 22, in which a plurality of teeth 450 are formed on the radially inwardly facing surface of the annular nut member 440. The nut member 440 does not have tabs as in the preferred embodiment. Instead of tabs that are displaced radially outwardly, the entire nut member 440 is deformed to permit the teeth 450 to slide over the teeth 26 formed on the shank member 8. Each tooth 450 forms a pawl that cooperates with the teeth 26 as described above for the preferred embodiment, but due to deformation of the nut member 440 rather than the bending of tabs only.

Figure 24:
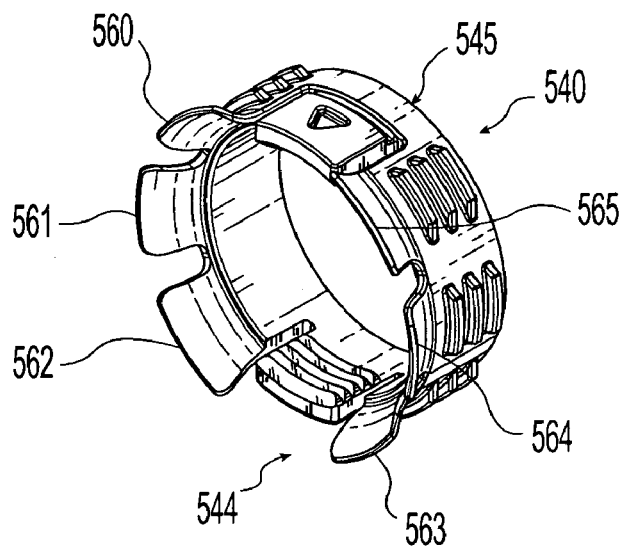
FIG. 24 is a view in perspective illustrating an alternative embodiment of the nut member.
Figure 25:
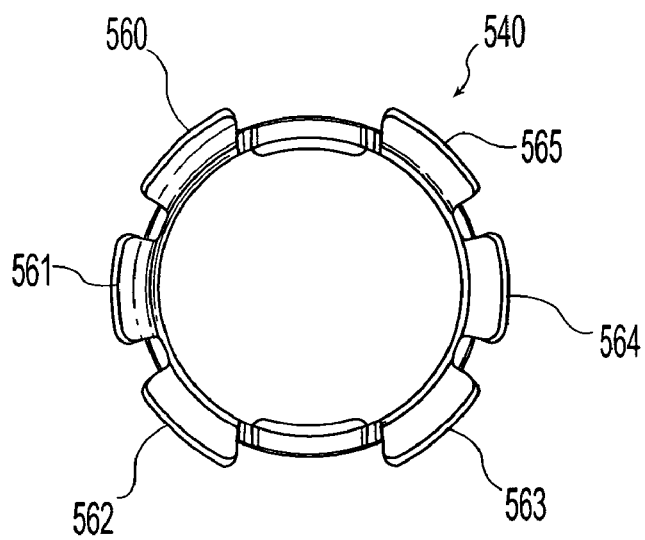
FIG. 25 is a top view illustrating the nut member of FIG. 24.
Figure 26:
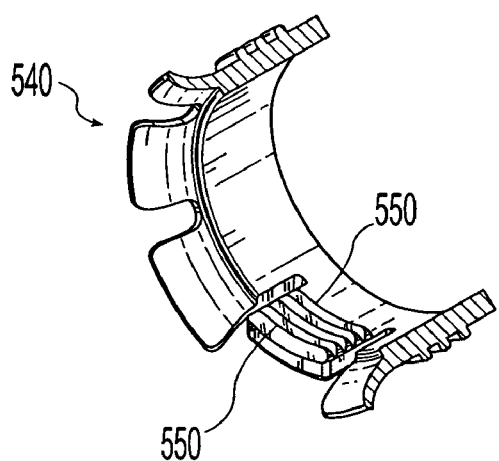
FIG. 26 is a view in section illustrating the nut member of FIG. 24.

Another alternative nut member 540 is shown in FIG. 24. The nut member 540 has an annular, circular cylindrical configuration with a first end 544 and a second end 545. The configuration of the nut member 540 is virtually identical to the nut member 40, with one substantial exception. Rather than the pair of flanges 60 and 61 formed on the nut member 40, the nut member 540 has a plurality of smaller flexible leaves 560–565. The leaves 560–565 extend longitudinally to form springs that can seat against a panel or other structure to which the invention is attached to. Thus, the leaves 560–565 perform essentially the same function as the flanges 60 and 61.

As described above, the protruding springs are an important element of the invention. A "spring" is a device which stores mechanical, potential energy as a function of its distortion, displacement, deflection or rotation (collectively referred to as displacement or deflection). A spring stores energy when it is displaced and returns energy when it returns to its non-displaced condition. The spring applies a force which is a function of its displacement. The relationship between spring force and spring displacement is the spring force coefficient, which, when the relationship is linear, is known as the spring constant.

One type of spring is the mechanical spring, which is displaced resiliently or elastically by mechanical deformation. These include coil springs, torsion bar springs, planar springs and other elastic bodies, such as an elastic cord, washer, block or ribbon. Another type of spring is the gas spring, in which a fluid, typically a gas, is confined to a variable volume container, such as an enclosed cylinder with a piston. A cantilever spring is a body, typically a beam, which is anchored to another body at an end and can bend in a resilient, elastic manner. The beam may be linear, curved, or include bends. Thus, a spring may be formed with any body that can flex, bend, expand, compress, or otherwise be deformed in a resiliently elastic manner. Springs can apply their force in a direction along a line or as a torque.

Another example of a spring is a magnetic spring. A magnetic spring can be formed either by placing two magnets in close proximity or by placing a magnet and a ferromagnetic material in close proximity. When placing two springs in close proximity, either the similar poles can face one another, or the dissimilar poles can face one another. One example of a magnetic spring used in the present invention is a magnet mounted to an end of the nut member with its north pole facing the panel and another magnet on the head of the shank member with its north pole facing the panel. The repulsive forces of the magnets would serve as a spring to bias the nut member and head of the shank member to avoid a loose fit with the panel. Alternatively, one could have magnets with dissimilar poles facing the interposed panel, thereby creating a bias by the magnets' attraction to one another. Alternatively, one could use a magnet on the nut member or shank member only, if the panel is made of a ferromagnetic material.

The preferred spring for the invention is a mechanical spring, which is attached to the nut member as described above. Alternatively, the spring could be attached to the head of the shank member. This would position the spring on the side of the panel or other structure opposite to the nut member. There would still be a spring applying a bias to the panel and one of the nut or shank members in this alternative embodiment. Still further, although it is preferred for the spring to be attached to one of the members, the spring could be a separate body that is interposed between the nut and the head with the panel or other structure. An example of such a spring is an elastomeric washer that fits over the shank member and is interposed between the panel and the nut member. Such a spring engages the panel member at one side and the nut member at the opposite side. Of course, such a spring could alternatively be interposed between the head and the panel.

While certain preferred embodiments of the present invention have been disclosed in detail, it is to be understood that various modifications may be adopted without departing from the spirit of the invention or scope of the following claims.

The invention claimed is:

1. A housing for mounting to, and extending through an aperture formed through, a panel having a first side and an opposite, second side, the housing comprising:
   (a) a shank member having first and second ends and a sidewall with a radially outwardly facing surface for extending through the aperture, the first end having a head;
   (b) an annular nut member having a radially inwardly facing surface and a first end;
   (c) a spring adapted to engage the panel and one of said members and apply a bias to the panel and the engaged member;
   (d) a plurality of longitudinally aligned teeth separated by gaps between adjacent teeth formed on the radially facing surface of a first of said members; and
   (e) at least one pawl formed on the radially facing surface of a second of said members, said at least one pawl being configured to extend into one of said gaps when the first of said members is positioned adjacent the second of said members.

2. The housing in accordance with claim 1, wherein the spring is mounted to one of said members for engaging the panel and applying the bias to the panel when the panel is interposed between the head and the nut member.

3. The housing in accordance with claim 2, wherein the spring is mounted to the nut member.

4. The housing in accordance with claim 3, wherein said plurality of aligned teeth is formed on the radially inwardly facing surface of the nut member, and said at least one pawl is formed on the radially outwardly facing surface of the shank member.

5. The housing in accordance with claim 3, wherein said plurality of aligned teeth is formed on the radially outwardly facing surface of the shank member, and said at least one pawl is formed on the radially inwardly facing surface of the nut member.

6. The housing in accordance with claim 5, wherein the teeth are aligned in first and second longitudinal teeth regions on substantially opposite sides of the radially outwardly facing surface of the shank member, and first and second substantially smooth longitudinal regions are formed therebetween on the radially outwardly facing surface of the shank member.

7. The housing in accordance with claim 6, wherein said at least one pawl further comprises first and second pawls disposed on substantially opposite sides of the radially inwardly facing surface of the nut member, and first and second substantially smooth longitudinal regions are formed therebetween on the radially inwardly facing surface of the nut member.

8. The housing in accordance with claim 7, wherein the substantially smooth longitudinal regions are substantially cylindrical surfaces.

9. The housing in accordance with claim 7, wherein the head comprises a region of the shank that extends radially outwardly of the sidewall, thereby forming a shoulder for seating against the panel.

10. The housing in accordance with claim 7, wherein the nut member is radially expandable for permitting radial displacement of the pawls away from the teeth.

11. The housing in accordance with claim 7, wherein the nut member further comprises a pair of radially flexible tabs on which the pawls are formed for permitting radial displacement of the pawls any from the teeth.

12. The housing in accordance with claim 11, wherein said longitudinal teeth regions further comprise first and second elongated, longitudinal channels formed on the radially outwardly facing surface of the shank member and in which said teeth are aligned, each channel having a radially outwardly facing floor defined by channel walls at opposite lateral channel sides and at which opposite ends of the respective plurality of teeth terminate, each channel wall being inclined from the channel floor radially outwardly toward the substantially smooth longitudinal regions for permitting a tip of each of said pawls to slide radially outwardly from a gap between the teeth to the substantially smooth longitudinal regions upon rotation of the nut member relative to the shank member.

13. The housing in accordance with claim 12, wherein the pawls register with said first and second channels for guiding the nut member onto the shank member when the nut member is positioned substantially coaxial to the shank member.

14. The housing in accordance with claim 7, wherein the spring is deformable a distance greater than a tooth wavelength.

15. The housing in accordance with claim 14, wherein the spring further comprises at least one resilient flange formed at the first end of the nut member.

16. The housing in accordance with claim 14, wherein the spring further comprises a plurality of resilient fingers formed at the first end of the nut member.

17. The housing in accordance with claim 7, wherein said shank member sidewall has a radially inwardly facing surface defining a chamber.

18. The housing in accordance with claim 17, wherein said chamber houses a sound-emitting transducer.

19. The housing in accordance with claim 18, further comprising a plurality of grip-aiding protrusions formed on a radially outwardly facing surface of the nut member.

20. The housing in accordance with claim 2, wherein the spring is mounted to the shank member.

21. The housing in accordance with claim 2, wherein said plurality of aligned teeth is formed on the radially inwardly facing surface of the nut member, and said at least one pawl is formed on the radially outwardly facing surface of the shank member.

22. The housing in accordance with claim 2, wherein said plurality of aligned teeth is formed on the radially outwardly facing surface of the shank member, and said at least one pawl is formed on the radially inwardly facing surface of the nut member.

23. A housing mounted to, end extending through an aperture formed through, a panel having a first side and an opposite, second side, the housing comprising:
  (a) a shank member having first and second ends and a sidewall with a radially outwardly facing surface extending through the aperture, the first end having a head on the first side of said panel;
  (b) an annular nut member having a radially inwardly facing surface and a first end, wherein the panel is interposed between the head and the nut member and the nut member is attached to the sidewall of the shank member on the second side of said panel with the radially inwardly facing surface of the nut member adjacent the radially outwardly facing surface of the shank member's sidewall;
  (c) a spring interposed between the head and the nut member and engaging the panel and one of said members and applying a bias to the panel and the engaged member;
  (d) a plurality of longitudinally aligned teeth separated by gaps between adjacent teeth formed on the radially facing surface of a first of said members; and
  (e) at least one pawl formed on the radially facing surface of a second of said members, said at least one pawl extending into one of said gaps for removably locking the nut member to the shank member.

24. The housing in accordance with claim 23, wherein the spring is mounted to one of said members, and said spring engages the panel and applies the bias to the panel.

25. The housing in accordance with claim 24, wherein the spring is mounted to the nut member.

26. The housing in accordance with claim 25, wherein said plurality of aligned teeth is formed on the radially inwardly facing surface of the nut member, and said at least one pawl is formed on the radially outwardly facing surface of the shank member.

27. The housing in accordance with claim 25, wherein said plurality of aligned teeth is formed on the radially outwardly facing surface of the shank member, and said at least one pawl is formed on the radially inwardly facing surface of the nut member.

28. The housing in accordance with claim 27, wherein the teeth are aligned in first and second longitudinal teeth regions on substantially opposite sides of the radially outwardly facing surface of the shank member, and first and second substantially smooth longitudinal regions are formed therebetween on the radially outwardly facing surface of the shank member.

29. The housing in accordance with claim 28, wherein said at least one pawl further comprises first and second pawls disposed on substantially opposite sides of the radially inwardly facing surface of the nut member, and first and second substantially smooth longitudinal regions are formed therebetween on the radially inwardly facing surface of the nut member.

30. The housing in accordance with claim 29, wherein the substantially smooth longitudinal regions are substantially cylindrical surfaces.

31. The housing in accordance with claim 30, wherein the head comprises a region of the shank member that extends radially outwardly of the sidewall, thereby forming a shoulder seating against the panel.

32. The housing in accordance with claim 29, wherein the nut member is radially expandable for permitting radial displacement of the pawls away from the teeth.

33. The housing in accordance with claim 29, wherein the nut member further comprises a pair of radially flexible tabs on which the pawls are formed for permitting radial displacement of the pawls away from the teeth.

34. The housing in accordance with claim 33, wherein said longitudinal teeth regions further comprise first and second elongated, longitudinal channels formed on the radially outwardly facing surface of to shank member and in which said teeth are aligned, each channel having a radially outwardly facing floor defined by channel walls at opposite lateral channel sides and at which opposite ends of the respective plurality of teeth terminate, each channel wall being inclined from the channel floor radially outwardly toward the substantially smooth longitudinal regions for permitting a tip of each of said pawls to slide radially outwardly from a gap between the teeth to the substantially smooth longitudinal regions upon rotation of the nut member relative to the shank member.

35. The housing in accordance with claim 34, wherein the pawls register with said first and second channels.

36. The housing in accordance with claim 29, wherein the spring is deformable a distance greater than a tooth wavelength.

37. The housing in accordance with claim 36, wherein the spring further comprises at least one resilient flange formed at the first end of the nut member.

38. The housing in accordance with claim 36, wherein the spring further comprises a plurality of resilient fingers formed at the first end of the nut member.

39. The housing in accordance with claim 29, wherein said shank member sidewall has a radially inwardly facing surface defining a chamber.

40. The housing in accordance with claim 39, wherein said chamber houses a sound-emitting transducer.

41. The housing in accordance with claim 40, further comprising a plurality of grip-aiding protrusions formed on a radially outwardly facing surface of the nut member.

42. The housing in accordance with claim 24, wherein the spring is mounted to the shank member.

43. The housing in accordance with claim 24, wherein said plurality of aligned teeth is formed on the radially inwardly facing surface of the nut member, and said at least one pawl is formed on the radially outwardly facing surface of the shank member.

44. The housing in accordance with claim 24, wherein said plurality of aligned teeth is formed on the radially outwardly facing surface of the shank member, and said at least one pawl is formed on the radially inwardly facing surface of the nut member.

45. A fastener for mounting to, and extending through an aperture formed through, a structure having a first side and an opposite, second side, the fastener comprising:
  (a) a shank member having first and second ends and a sidewall with a radially outwardly facing surface for extending through the aperture, the first end having a head;
  (b) an annular nut member having a radially inwardly facing surface and a first end;
  (c) a spring adapted to engage the structure and one of the members and apply a bias to the structure and the engaged member;
  (d) a plurality of longitudinally aligned teeth separated by gaps between adjacent teeth formed on the radially facing surface of a first of said members; and
  (e) at least one pawl formed on the radially facing surface of a second of said members, said at least one pawl being configured to extend into one of said gaps when the first of said members is positioned adjacent the second of said members.

46. The fastener in accordance with claim 45, wherein the spring is mounted to one of said members for engaging the structure and applying the bias to the structure when the structure is interposed between the head and the nut member.

47. The fastener in accordance with claim 46, wherein the spring is mounted to the nut member.

48. The fastener in accordance with claim 47, wherein said plurality of aligned teeth is formed on the radially inwardly facing surface of the nut member, and said at least one pawl is formed on the radially outwardly facing surface of the shank member.

49. The fastener in accordance with claim 47, wherein said plurality of aligned teeth is formed on the radially outwardly facing surface of the shank member, and said at least one pawl is formed on the radially inwardly facing surface of the nut member.

50. The fastener in accordance with claim 49, wherein the teeth are aligned in first and second longitudinal teeth regions on substantially opposite sides of the radially outwardly facing surface of the shank member, and first and second substantially smooth longitudinal regions are formed therebetween on the radially outwardly facing surface of the shank member.

51. The fastener in accordance with claim 50, wherein said at least one pawl further comprises first and second pawls disposed on substantially opposite sides of the radially inwardly facing surface of the nut member, and first and second substantially smooth longitudinal regions are formed therebetween on the radially inwardly facing surface of the nut member.

52. The fastener in accordance with claim 51, wherein the substantially smooth longitudinal regions are substantially cylindrical surfaces.

53. The fastener in accordance with claim 51, wherein the head comprises a region of the shank that extends radially outwardly of the sidewall, thereby forming a shoulder for seating against the structure.

54. The fastener in accordance with claim 51, wherein the nut member is radially expandable for permitting radial displacement of the pawls away from the teeth.

55. The fastener in accordance with claim 51, wherein the nut member further comprises a pair of radially flexible tabs on which the pawls are formed for permitting radial displacement of the pawls away from the teeth.

56. The fastener in accordance with claim 55, wherein said longitudinal teeth regions further comprise first and second elongated, longitudinal channels formed on the radially outwardly facing surface of the shank member and in which said teeth are aligned, each channel having a radially outwardly facing floor defined by channel walls at opposite lateral channel sides and at which opposite ends of the respective plurality of teeth terminate, each channel wall being inclined from the channel floor radially outwardly toward the substantially smooth longitudinal regions for permitting a tip of each of said pawls to slide radially outwardly from a gap between the teeth to the substantially smooth longitudinal regions upon rotation of the nut member relative to the shank member.

57. The fastener in accordance with claim 56, wherein the pawls register with said first and second channels for guiding the nut member onto the shank member when the nut member is positioned substantially coaxial to the shank member.

58. The fastener in accordance with claim 51, wherein the spring is deformable a distance greater than a tooth wavelength.

59. The fastener in accordance with claim 58, wherein the spring further comprises at least one resilient flange formed at the first end of the nut member.

60. The fastener in accordance with claim 58, wherein the spring further comprises a plurality of resilient fingers formed at the first end of the nut member.

61. The fastener in accordance with claim 51, wherein said shank member sidewall has a radially inwardly facing surface defining a chamber.

62. The fastener in accordance with claim 61, further comprising a plurality of grip-aiding protrusions formed on a radially outwardly facing surface of the nut member.

63. The fastener in accordance with claim 46, wherein the spring is mounted to the shank member.

64. The fastener in accordance with claim 46, wherein said plurality of aligned teeth is formed on the radially inwardly facing surface of the nut member, and said at least one pawl is formed on the radially outwardly facing surface of the shank member.

65. The fastener in accordance with claim 46, wherein said plurality of aligned teeth is formed on the radially outwardly facing surface of the shank member, and said at least one pawl is formed on the radially inwardly facing surface of the nut member.

66. A fastener mounted to, and extending through an aperture formed through, a structure having a first side and an opposite, second side, the fastener comprising:
  (a) a shank member having first and second ends and a sidewall with a radially outwardly facing surface extending through the aperture, the first end having a head on the first side of said structure;
  (b) an annular nut member having a radially inwardly facing surface and a first end, wherein said structure is interposed between the head and the nut member and the nut member is attached to the sidewall of the shank member on the second side of said structure with the radially inwardly facing surface of the nut member adjacent the radially outwardly facing surface of the shank member's sidewall;
  (c) a spring interposed between the head and the nut member, and engaging said structure and one of the members and applying a bias to said structure and the engaged member;
  (d) a plurality of longitudinally aligned teeth separated by gaps between adjacent teeth formed on the radially facing surface of a first of said members; and
  (e) at least one pawl formed on the radially facing surface of a second of said members, said at least one pawl extending into one of said gaps for removably locking the nut member to the shank member.

67. The fastener in accordance with claim 66, wherein the spring is mounted to one of said members, and said spring engages the structure and applies the bias to the structure.

68. The fastener in accordance with claim 67, wherein the spring is mounted to the nut member.

69. The fastener in accordance with claim 68, wherein said plurality of aligned teeth is formed on the radially inwardly facing surface of the nut member, and said at least one pawl is formed on the radially outwardly facing surface of the shank member.

70. The fastener in accordance with claim 68, wherein said plurality of aligned teeth is formed on the radially outwardly facing surface of the shank member, and said at least one pawl is formed on the radially inwardly facing surface of the nut member.

71. The fastener in accordance with claim 70, wherein the teeth are aligned in first and second longitudinal teeth regions on substantially opposite sides of the radially outwardly facing surface of the shank member, and first and second substantially smooth longitudinal regions are formed therebetween on the radially outwardly facing surface of the shank member.

72. The fastener in accordance with claim 71, wherein said at least one pawl further comprises first and second pawls disposed on substantially opposite sides of the radially inwardly facing surface of the nut member, and first and second substantially smooth longitudinal regions are formed therebetween on the radially inwardly facing surface of the nut member.

73. The fastener in accordance with claim 72, wherein the substantially smooth longitudinal regions are substantially cylindrical surfaces.

74. The fastener in accordance with claim 73, wherein the head comprises a region of the shank member that extends radially outwardly of the sidewall, thereby forming a shoulder seating against the structure.

75. The fastener in accordance with claim 72, wherein the nut member is radially expandable for permitting radial displacement of the pawls away from the teeth.

76. The fastener in accordance with claim 72, wherein the nut member further comprises a pair of radially flexible tabs on which the pawls are formed for permitting radial displacement of the pawls away from the teeth.

77. The fastener in accordance with claim 76, wherein said longitudinal teeth regions further comprise first and second elongated, longitudinal channels formed on the radially outwardly facing surface of the shank member and in which said teeth are aligned, each channel having a radially outwardly facing floor defined by channel walls at opposite lateral channel sides and at which opposite ends of the respective plurality of teeth terminate, each channel wall being inclined from the channel floor radially outwardly toward the substantially smooth longitudinal regions for permitting a tip of each of said pawls to slide radially outwardly from a gap between the teeth to the substantially smooth longitudinal regions upon rotation of the nut member relative to the shank member.

78. The fastener in accordance with claim 77, wherein the pawls register with said first and second channels.

79. The fastener in accordance with claim 72, wherein the spring is deformable a distance greater than a tooth wavelength.

80. The fastener in accordance with claim 79, wherein the spring further comprises at least one resilient flange formed at the first end of the nut member.

81. The fastener in accordance with claim 79, wherein the spring further comprises a plurality of resilient fingers formed at the first end of nut member.

82. The fastener in accordance with claim 72, wherein said shank member sidewall has a radially inwardly facing surface defining a chamber.

83. The fastener in accordance with claim 82, further comprising a plurality of grip-aiding protrusions formed on a radially outwardly facing surface of the nut member.

84. The fastener in accordance with claim 67, wherein the spring is mounted to the shank member.

85. The fastener in accordance with claim 67, wherein said plurality of aligned teeth is formed on the radially inwardly facing surface of the nut member, and said at least one pawl is formed on the radially outwardly facing surface of the shank member.

86. The fastener in accordance with claim 67, wherein said plurality of aligned teeth is formed on the radially outwardly facing surface of the shank member, and said at least one pawl is formed on the radially inwardly facing surface of the nut member.

* * * * *

UNITED STATES PATENT AND TRADEMARK OFFICE
CERTIFICATE OF CORRECTION

PATENT NO. : 7,090,454 B2  
APPLICATION NO. : 10/651280  
DATED : August 15, 2006  
INVENTOR(S) : Thomas A. Shain Page 1 of 1

It is certified that error appears in the above-identified patent and that said Letters Patent is hereby corrected as shown below:

Claim 11, line 24, add --away--, delete "any"

Signed and Sealed this

Thirty-first Day of October, 2006

JON W. DUDAS  
*Director of the United States Patent and Trademark Office*